United States Patent
Brensinger et al.

(10) Patent No.: US 9,848,689 B2
(45) Date of Patent: Dec. 26, 2017

(54) SLEEPING BAG HAVING WATERPROOF BOTTOM AND SIDE WALLS AND ENCLOSURE FOR A SLEEPING PAD

(71) Applicant: Nemo Equipment, Inc., Dover, NH (US)

(72) Inventors: Cam Brensinger, Stratham, NH (US); Kurtis Schnackenberg, Dover, NH (US); Thomas Bath, Portsmouth, NH (US)

(73) Assignee: Nemo Equipment, Inc., Dover, NH (US)

( * ) Notice: Subject to any disclaimer, the term of this patent is extended or adjusted under 35 U.S.C. 154(b) by 0 days.

(21) Appl. No.: 15/223,363

(22) Filed: Jul. 29, 2016

(65) Prior Publication Data
US 2017/0027343 A1 Feb. 2, 2017

Related U.S. Application Data

(60) Provisional application No. 62/199,481, filed on Jul. 31, 2015.

(51) Int. Cl.
| | |
|---|---|
| *A47G 9/08* | (2006.01) |
| *A45F 3/22* | (2006.01) |
| *A47C 27/08* | (2006.01) |
| *A47C 27/14* | (2006.01) |
| *B29C 65/02* | (2006.01) |
| *B29K 75/00* | (2006.01) |
| *B29L 31/00* | (2006.01) |

(52) U.S. Cl.
CPC .............. *A45F 3/22* (2013.01); *A47C 27/081* (2013.01); *A47C 27/084* (2013.01); *A47C 27/146* (2013.01); *A47G 9/086* (2013.01); *B29C 65/02* (2013.01); *B29K 2075/00* (2013.01); *B29L 2031/751* (2013.01)

(58) Field of Classification Search
CPC .......... A47C 9/08; A47C 9/083; A47C 9/086; A41B 13/06; A41B 13/065; A47G 9/08; A47G 9/083; A47G 9/086
USPC ............................. 5/413 R, 413 AM; 2/69.5
See application file for complete search history.

(56) References Cited

U.S. PATENT DOCUMENTS

| | | | | |
|---|---|---|---|---|
| 2,637,048 A * | 5/1953 | Peters et al. | ........... | A47G 9/086 5/413 R |
| 4,090,269 A * | 5/1978 | Hunt | ...................... | A47G 9/086 2/69.5 |
| 4,862,533 A * | 9/1989 | Adams, III | .......... | A47C 27/081 417/472 |
| 5,640,725 A * | 6/1997 | Ando | ..................... | A47G 9/086 5/413 AM |
| 5,706,532 A * | 1/1998 | Kettenhofen | .......... | A47G 9/086 40/299.01 |
| 5,966,756 A * | 10/1999 | Cartier | ................... | A47G 9/086 2/69.5 |
| 6,675,414 B2 * | 1/2004 | Lamke | .................. | A47G 9/086 5/413 AM |

(Continued)

*Primary Examiner* — Robert G Santos

(57) ABSTRACT

A sleeping bag having a waterproof bottom and side wall region. The bottom region extending vertically upward is made from a waterproof material. A cavity formed above the bottom region includes an opening into which may be inserted and removed a sleeping pad. A top region creates a cavity for holding insulative material. A sleeping cavity is provided between the top cavity and the bottom cavity.

6 Claims, 1 Drawing Sheet

(56) References Cited

U.S. PATENT DOCUMENTS

| | | | |
|---|---|---|---|
| 7,418,748 B2 * | 9/2008 | Lamke | A47G 9/086 5/413 AM |
| 8,769,741 B2 * | 7/2014 | Colleran | A47G 9/086 5/413 AM |
| 2004/0123385 A1 * | 7/2004 | Lamke | A47G 9/086 5/413 AM |
| 2009/0044333 A1 * | 2/2009 | Colleran | A47G 9/086 5/413 R |
| 2017/0027343 A1 * | 2/2017 | Brensinger | A47G 9/086 |

* cited by examiner

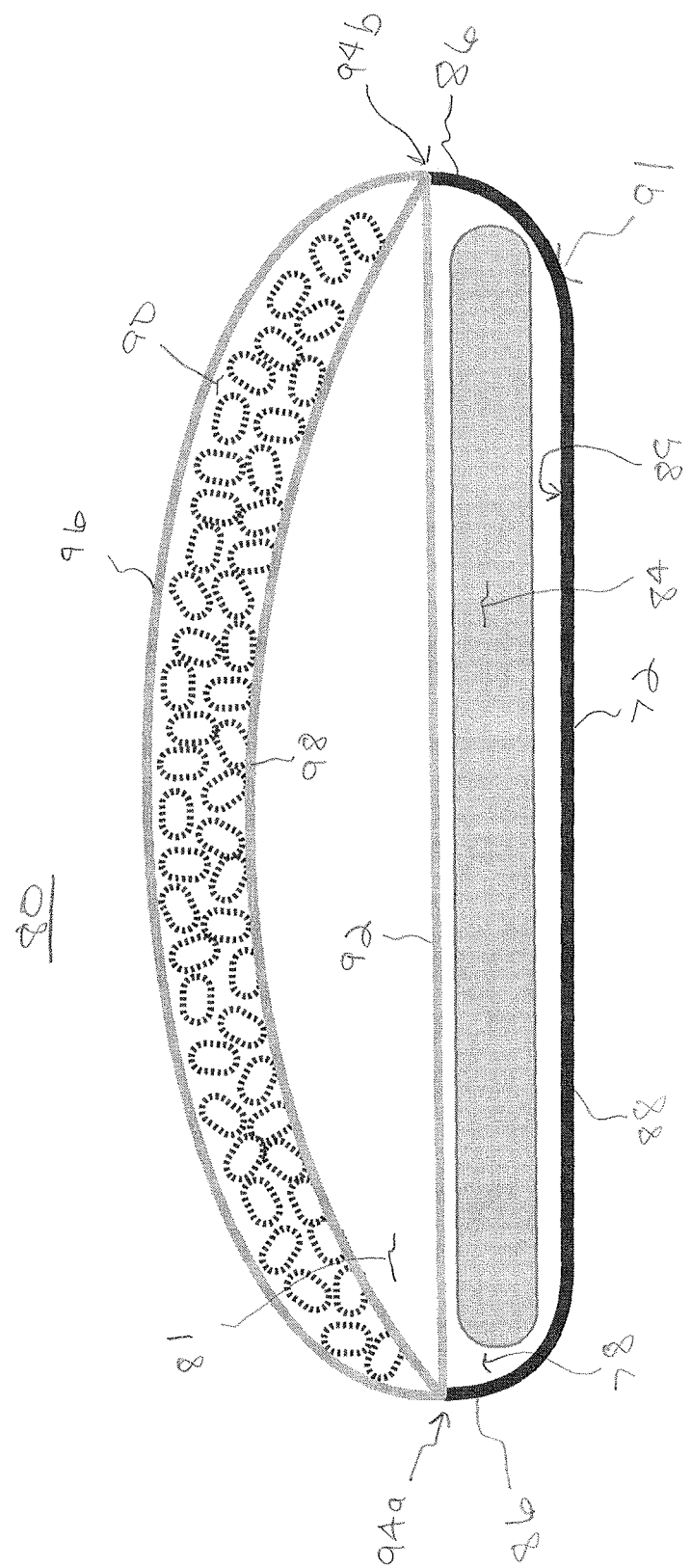

SLEEPING BAG HAVING WATERPROOF BOTTOM AND SIDE WALLS AND ENCLOSURE FOR A SLEEPING PAD

CROSS-REFERENCE TO RELATED APPLICATIONS

This application claims priority from U.S. Provisional Patent Application No. 62/199,481, titled "OUTDOOR EQUIPMENT 2015", which was filed on Jul. 31, 2015 and is incorporated fully herein by reference.

TECHNICAL FIELD

The present invention relates to outdoor equipment and more particularly, relates to a sleeping bag providing a waterproof tub or bottom and sidewall region and an opening for the insertion of a sleeping pad into a bottom region of the tub.

BACKGROUND INFORMATION

Sleeping bags are well-known and used for outdoor recreation as well as for required outdoor sleeping in many situations. Unfortunately, in many situations, the ground on which the sleeping bag must rest is often damp, wet and may even become muddy either initially or overnight. Not only does this significantly dirty the sleeping bag but most importantly, moisture will seep into the bag and affect the insulation in the sleeping bag and the comfort of the occupant. In other situations, the user may place a sleeping pad on the ground on top of which the sleeping bag is placed. Although this may prevent the sleeping bag from becoming dirty and may perhaps prevent moisture from reaching the user, the sleeping pad now becomes dirtied and must deal with all the moisture from the bottom.

Accordingly, what is needed is a sleeping bag/sleeping pad enclosure which has a waterproof tub (bottom and side wall regions) as well as a slot or opening into which a sleeping pad may be inserted, in order to keep the sleeping pad and sleeping bag clean and prevent moisture from reaching the user.

SUMMARY OF THE INVENTION

The present invention features, in a first embodiment, a sleeping bag having a waterproof bottom and side walls and comprising a top member and a bottom member, each of the top and bottom members having first and second longitudinal edges. The top and bottom members are joined together proximate the first and second longitudinal edges. The bottom member comprises a waterproof fabric.

The sleeping bag includes a first interior member having first and second longitudinal edges, The first and second longitudinal edges of the first interior member are coupled proximate the first and second longitudinal edges of the top and bottom members. The first interior member forms a first cavity between the first interior member and the top member. The first cavity is configured for containing an insulative material.

A second interior member having first and second longitudinal edges is provided. The first and second longitudinal edges of the second interior member are coupled proximate the first and second longitudinal edges of the top, bottom and first interior members and forms a second cavity between the second interior member and the bottom member. The second cavity is configured for removably containing a sleeping pad, wherein the second interior member includes an opening configured for allowing the sleeping pad to be inserted into and removed from the second cavity. A third cavity is formed between the first and second interior members and configured for serving as a user sleeping region.

The insulative material disposed in the first cavity may be selected from the group of insulative materials consisting of natural insulative materials and synthetic insulative materials. The natural insulative material may include goose down while the synthetic insulative material may be selected from the group of synthetic insulative materials including Polar-Guard® synthetic insulative material, Quallofil® synthetic insulative material, Hollofil® synthetic insulative material and Thermolite™ synthetic insulative material.

In another embodiment, the second interior member is coupled to the first interior member proximate the first and second longitudinal edges of the first interior member. The bottom member may extend across a bottom region of the sleeping bag and turn upwardly forming a generally vertical sidewall region of between 1.5 inches to 3 inches prior to being joined together with the top member.

In yet another embodiment, the present invention features a sleeping bag having a waterproof bottom and side walls and comprising a top member and a bottom member, each of the top and bottom members having first and second longitudinal edges. The top and bottom members are joined together proximate the first and second longitudinal edges. The bottom member comprises a waterproof fabric.

The sleeping bag includes a first interior member having first and second longitudinal edges, The first and second longitudinal edges of the first interior member are coupled proximate the first and second longitudinal edges of the top and bottom members. The first interior member forms a first cavity between the first interior member and the top member. The first cavity is configured for containing an insulative material.

A second interior member having first and second longitudinal edges is provided. The first and second longitudinal edges of the second interior member are coupled to the first interior member proximate the first and second longitudinal edges of the first interior member and form a second cavity between the second interior member and the bottom member.

The second cavity is configured for removably containing a sleeping pad, wherein the second interior member includes an opening configured for allowing the sleeping pad to be inserted into and removed from the second cavity. A third cavity is formed between the first and second interior members and configured for serving as a user sleeping region.

In a further embodiment, the present invention features a sleeping bag having a waterproof bottom and side walls and comprising a top member and a bottom member, each of the top and bottom members having first and second longitudinal edges. The top and bottom members are joined together proximate the first and second longitudinal edges. The bottom member comprises a waterproof fabric and wherein the bottom member extends across a bottom region of the sleeping bag and turns upward forming a generally vertical sidewall region prior to being joined together with the top member.

The sleeping bag includes a first interior member having first and second longitudinal edges, The first and second longitudinal edges of the first interior member are coupled proximate the first and second longitudinal edges of the top and bottom members. The first interior member forms a first cavity between the first interior member and the top member. The first cavity is configured for containing an insulative material.

A second interior member having first and second longitudinal edges is provided. The first and second longitudinal edges of the second interior member are coupled proximate the first and second longitudinal edges of the top, bottom and first interior members and forms a second cavity between the second interior member and the bottom member. The second cavity is configured for removably containing a sleeping pad, wherein the second interior member includes an opening configured for allowing the sleeping pad to be inserted into and removed from the second cavity. A third cavity is formed between the first and second interior members and configured for serving as a user sleeping region.

BRIEF DESCRIPTION OF THE DRAWINGS

These and other features and advantages of the present invention will be better understood by reading the following detailed description, taken together with the drawings wherein:

FIG. 1 is a perspective view of a sleeping bag having a waterproof tub and opening in which to slide a sleeping pad according to one feature of the present invention;

DETAILED DESCRIPTION OF THE PREFERRED EMBODIMENTS

The present invention features a sleeping bag with sleeping pad enclosure 80, FIG. 1, having a weatherproof and waterproof bottom member 72 comprising a bottom portion 88 and vertically upward extending sidewall regions or portions 86 forming what will sometimes be referred to as a waterproof "tub" as will be explained further below. The sleeping bag with sleeping pad enclosure 80 has an opening (not shown for clarity's sake) in the liner 92. This feature of the present invention includes a sleeping bag enclosure 80 having a horizontal/side-to-side or longitudinal slot or opening in the sleeping bag bottom lining 92 which serves to allow the user to insert and remove a sleeping pad 84 into the bottom cavity 78 of the sleeping bag. The sleeping bag pad 84 may be any type of sleeping pad (air inflated or foam pad) and any temperature rating.

Another feature of the sleeping bag enclosure according to the invention is the formation of a waterproof "tub" comprising side walls 86 and bottom region 88 which are constructed of a waterproof material such as 20D waterproof fabric and together form the bottom member 72.

In the preferred embodiment, the waterproof tub formed by the bottom member 72 comprising bottom region 88 and the upward extending side wall portions 86 which extend upwards from 1.5 to 3 inches is made of a material that is coated with a polyurethane coating on the inside 89 and has a water repellent finish/coating on the outside 91. The bottom member 72, the liner 92 and the top fabric layer 96 as well as the first intermediate member fabric layer 98 all come together at corners 94a and 94b.

The corners 94a and 94b are stitched and taped which, combined with any interior and exterior coatings of the side wall sections 86, create a waterproof "tub" protecting both the sleeping pad 84 located inside the sleeping bag bottom region and the sleeping bag itself as well as the user from moisture entering the sleeping bag from the bottom and/or side of the enclosure 80.

Any type and temperature rating of sleeping bag insulative material 90 is provided and sandwiched in the first and top most cavity 80 between a top fabric layer 96 and first intermediate member fabric layer 98, and is provided as is well known in the art. Such insulative material includes natural material such as goose down, or a synthetic insulative material such as PolarGuard® synthetic insulative material, Quallofil® synthetic insulative material, Hollofil® synthetic insulative material or Thermolite™ synthetic insulative material.

A third cavity 81 is formed between the upper fabric member 98 and the lower fabric member 92 as serves as the sleeping cavity for a user of the sleeping bag.

According to the present invention, a sleeping bag 80 enclosing a sleeping pad 84 in a waterproof tub comprised of side walls 86 and a bottom surface 88 keeps the sleeping pad 84 dry and prevents moisture from affecting the sleeping pad and the user.

Modifications and substitutions by one of ordinary skill in the art are considered to be within the scope of the present invention, which is not to be limited except by the allowed claims and their legal equivalents.

What is claimed is:

1. A sleeping bag having a waterproof bottom and side walls, said sleeping bag comprising:
    a top member and a bottom member, each of said top and bottom members having first and second longitudinal edges, said top and bottom members joined together proximate said first and second longitudinal edges, said bottom member comprising a waterproof fabric, wherein said bottom member extends across a bottom region of said sleeping bag and turns upward forming first and second generally vertical sidewall regions of between 1.5 inches to 3 inches prior to being joined together with said top member and wherein said bottom member is configured for being placed on a ground level surface;
    a first interior member having first and second longitudinal edges, said first and second longitudinal edges of said first interior member coupled proximate said first and second longitudinal edges of said top and bottom members, said first interior member forming a first cavity between said first interior member and said top member, said first cavity configured for containing an insulative material;
    a second interior member having first and second longitudinal edges, said first and second longitudinal edges of said second interior member coupled proximate said first and second longitudinal edges of said top, bottom and first interior members, and forming a second cavity between said second interior member and said bottom member, said second cavity configured for removably containing a sleeping pad, wherein said second interior member includes an opening configured for allowing said sleeping pad to be inserted into and removed from said second cavity; and
    wherein a third cavity is formed between said first and second interior members, said third cavity configured for serving as a user sleeping region.

2. The sleeping bag of claim 1, wherein said insulative material disposed in said first cavity is selected from the group of insulative materials consisting of natural insulative materials and synthetic insulative materials.

3. The sleeping bag of claim 2, wherein said natural insulative material includes goose down.

4. The sleeping bag of claim 1, wherein said second interior member is coupled to said first interior member proximate said first and second longitudinal edges of said first interior member.

5. A sleeping bag having a waterproof bottom and side walls, said sleeping bag comprising:
- a top member and a bottom member, each of said top and bottom members having first and second longitudinal edges, said top and bottom members joined together proximate said first and second longitudinal edges, said bottom member comprising a waterproof fabric, wherein said bottom member extends across a bottom region of said sleeping bag and turns upward forming first and second generally vertical sidewall regions of between 1.5 inches to 3 inches prior to being joined together with said top member and wherein said bottom member is configured for being placed on a ground level surface;
- a first interior member having first and second longitudinal edges, said first and second longitudinal edges of said first interior member coupled proximate said first and second longitudinal edges of said top and bottom members, said first interior member forming a first cavity between said first interior member and said top member, said first cavity configured for containing and insulative material;
- a second interior member having first and second longitudinal edges, said first and second longitudinal edges of said second interior member coupled to said first interior member proximate said first and second longitudinal edges of said first interior member and forming a second cavity between said second interior member and said bottom member, said second cavity configured for removably containing a sleeping pad, wherein said second interior member includes an opening configured for allowing said sleeping pad to be inserted into and removed from said second cavity; and
- wherein a third cavity is formed between said first and second interior members, said third cavity configured for serving as a user sleeping region.

6. A sleeping bag having a waterproof bottom and side walls, said sleeping bag comprising:
- a top member and a bottom member, each of said top and bottom members having first and second longitudinal edges, said top and bottom members joined together proximate said first and second longitudinal edges, said bottom member comprising a waterproof fabric and wherein said bottom member extends across a bottom region of said sleeping bag and turns upward forming first and second generally vertical sidewall regions of between 1.5 inches to 3 inches prior to being joined together with said top member and wherein said bottom member is configured for being placed on a ground level surface;
- a first interior member having first and second longitudinal edges, said first and second longitudinal edges of said first interior member coupled proximate said first and second longitudinal edges of said top and bottom members, said first interior member forming a first cavity between said first interior member and said top member, said first cavity configured for containing and insulative material;
- a second interior member having first and second longitudinal edges, said first and second longitudinal edges of said second interior member coupled proximate said first and second longitudinal edges of said top, bottom and first interior members, and forming a second cavity between said second interior member and said bottom member, said second cavity configured for removably containing a sleeping pad, wherein said second interior member includes an opening configured for allowing said sleeping pad to be inserted into and removed from said second cavity; and
- wherein a third cavity is formed between said first and second interior members, said third cavity configured for serving as a user sleeping region.

* * * * *